(12) United States Patent
Grimminger

(10) Patent No.: US 9,873,288 B2
(45) Date of Patent: Jan. 23, 2018

(54) HUB ARRANGEMENT FOR TWIN WHEELS

(71) Applicant: Kessler & Co. GmbH & Co. KG, Abtsgmund (DE)

(72) Inventor: Simon Grimminger, Aalen (DE)

(73) Assignee: Kessler & Co. GmbH & Co. KG, Abtsgmund (DE)

( * ) Notice: Subject to any disclaimer, the term of this patent is extended or adjusted under 35 U.S.C. 154(b) by 0 days.

(21) Appl. No.: 15/298,455

(22) Filed: Oct. 20, 2016

(65) Prior Publication Data

US 2017/0190214 A1    Jul. 6, 2017

(30) Foreign Application Priority Data

Oct. 22, 2015  (DE) .................. 10 2015 118 052

(51) Int. Cl.
*B62D 61/10*    (2006.01)
*B60B 35/12*    (2006.01)
(Continued)

(52) U.S. Cl.
CPC ............ *B60B 35/125* (2013.01); *B60B 11/02* (2013.01); *B60B 27/0021* (2013.01); *B60B 27/0052* (2013.01); *B60B 27/0063* (2013.01); *B60B 27/06* (2013.01); *B60K 17/046* (2013.01); *B60K 17/16* (2013.01); *B60T 1/065* (2013.01); *F16H 37/0813* (2013.01); *F16H 48/08* (2013.01); *B60B 2360/10* (2013.01); *B60B 2900/114* (2013.01); *B60B 2900/311* (2013.01); *B60B 2900/711* (2013.01); *B60B 2900/721* (2013.01)

(58) Field of Classification Search
CPC ....... B60B 11/02; B60B 11/06; B60K 17/046; B60K 17/36; F16D 65/186; F16D 2121/02
USPC .... 180/24.03, 342, 343, 370, 371, 383, 385; 301/36.1, 36.2
See application file for complete search history.

(56) References Cited

U.S. PATENT DOCUMENTS 2,132,029 A * 10/1938 Higbee ................... B60B 11/06
188/18 A
2,222,695 A * 11/1940 Velo ........................ B60B 11/02
180/22
(Continued)

FOREIGN PATENT DOCUMENTS

DE     102011078132 A1   12/2012
EP        1145894 A2      10/2001
(Continued)

*Primary Examiner* — Toan To
(74) *Attorney, Agent, or Firm* — Dinsmore & Shohl LLP

(57) ABSTRACT

A hub arrangement for twin wheels comprises a stationary carrier; an intermediate hub which is rotatable about an axis of rotation and which can be driven by a drive shaft; a differential gear having an input which is connected to the intermediate hub; a first wheel hub which is connected to a first output of the differential gear; and a second wheel hub which is connected to a second output of the differential gear. The hub arrangement furthermore comprises a first braking apparatus which is effective between the stationary carrier and the intermediate hub and a second braking apparatus which is effective between the stationary carrier and the second wheel hub or between the intermediate hub and the second wheel hub. In this respect, the first braking apparatus and the second braking apparatus can be actuated separately from one another.

12 Claims, 6 Drawing Sheets

(51) Int. Cl.
*B60B 11/02* (2006.01)
*B60B 27/00* (2006.01)
*B60B 27/06* (2006.01)
*B60K 17/04* (2006.01)
*B60K 17/16* (2006.01)
*B60T 1/06* (2006.01)
*F16H 37/08* (2006.01)
*F16H 48/08* (2006.01)

(56) References Cited

U.S. PATENT DOCUMENTS

| | | | | |
|---|---|---|---|---|
| 2,260,828 | A * | 10/1941 | Burger | B60B 11/06 188/18 R |
| 2,267,362 | A | 12/1941 | Ash | |
| 2,357,343 | A | 9/1944 | Morgan | |
| 2,512,050 | A * | 6/1950 | Ash | B60B 11/02 180/24.03 |
| 2,727,582 | A * | 12/1955 | Lisenby | B60B 11/02 180/24.03 |
| 2,773,723 | A * | 12/1956 | Randall | B60T 1/067 180/22 |
| 2,935,278 | A * | 5/1960 | Lesley | B64C 25/08 244/103 R |
| 3,770,074 | A * | 11/1973 | Sherman | B60K 7/0007 180/339 |
| 6,254,193 | B1 | 7/2001 | Bowman et al. | |
| 6,527,073 | B1 * | 3/2003 | Bowman | B60K 17/36 180/22 |
| 6,672,985 | B2 * | 1/2004 | Chung | B60K 17/046 180/24.03 |
| 7,757,795 | B2 * | 7/2010 | Chien | B60B 11/02 180/24.03 |
| 8,955,623 | B2 * | 2/2015 | Bittlingmaier | B60B 11/02 180/24.03 |
| 9,545,818 | B2 * | 1/2017 | Frum | B60B 11/02 |

FOREIGN PATENT DOCUMENTS

| | | |
|---|---|---|
| EP | 1162082 A2 | 12/2001 |
| EP | 1288054 A1 | 3/2003 |
| WO | 2014170728 A1 | 10/2014 |

\* cited by examiner

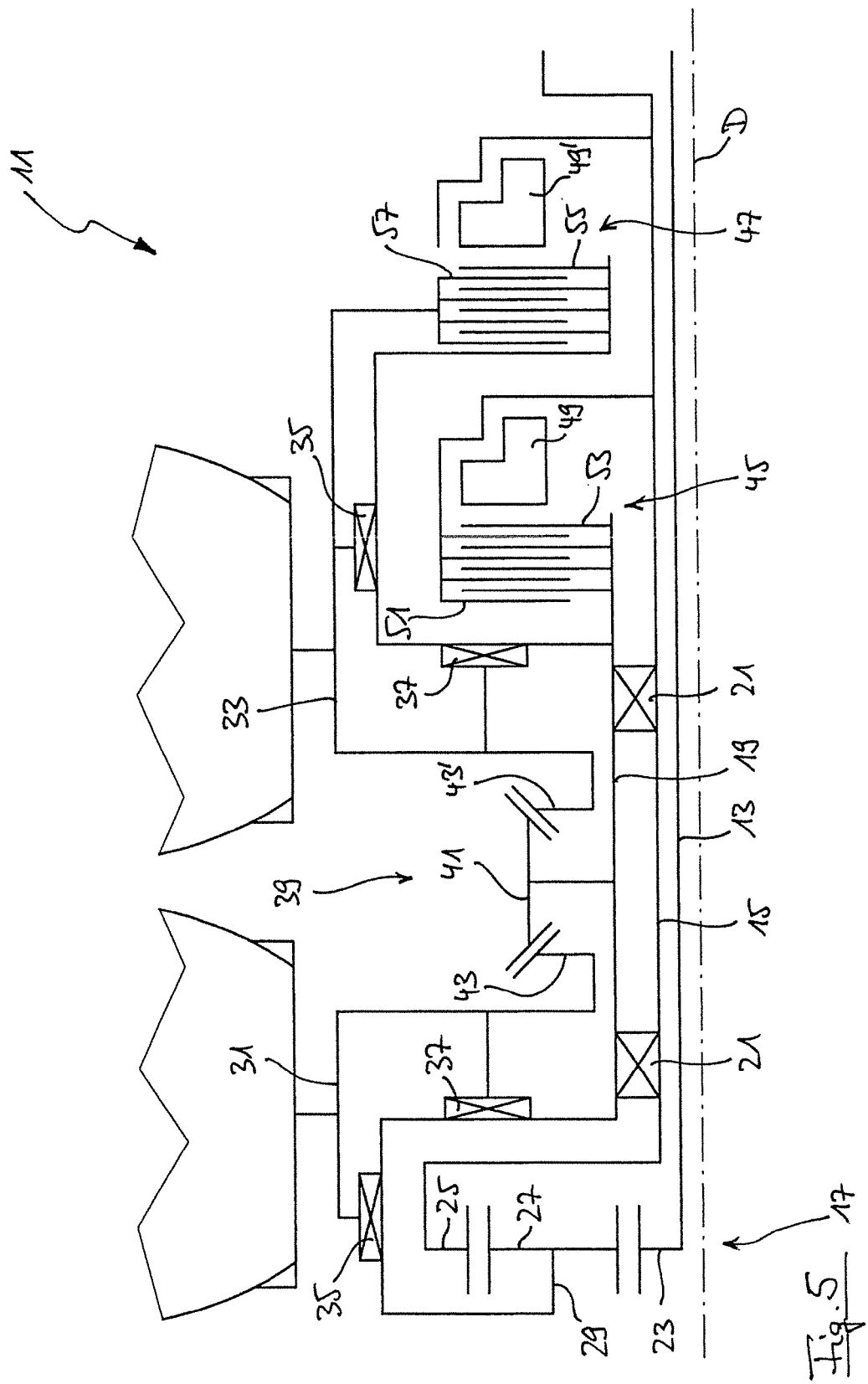

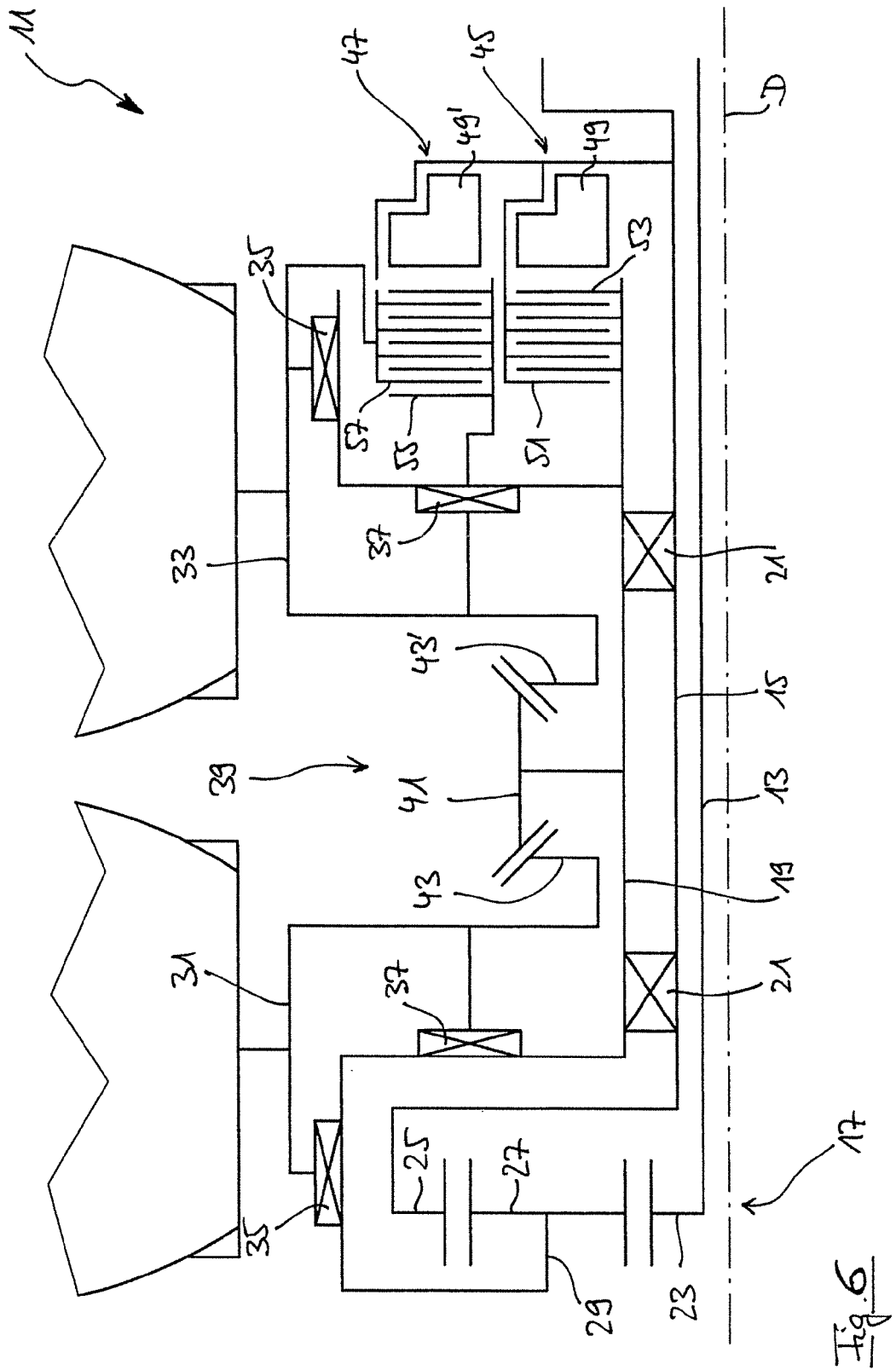

HUB ARRANGEMENT FOR TWIN WHEELS

CROSS-REFERENCE TO RELATED APPLICATIONS

This application claims priority of German Patent Application 102015118052.9 filed on Oct. 22, 2015.

FIELD OF THE INVENTION

The present invention relates to a hub arrangement for twin wheels having a stationary carrier, a first wheel hub and a second wheel hub.

BACKGROUND OF THE INVENTION

A hub arrangement for twin wheels is known, for example, from U.S. Pat. No. 8,955,623 B2. In the hub arrangement disclosed therein, the first wheel hub is supported at the stationary carrier rotatable about an axis of rotation and the second wheel hub is supported at the first wheel hub rotatable about the same axis of rotation. A drive shaft which drives the first wheel hub via a reduction gear is provided in the stationary carrier configured as an axle funnel. To brake the hub arrangement, respective brake apparatus are associated with the first wheel hub and with the second wheel hub; they brake the respective hub with respect to the stationary carrier and can be actuated together. In addition, the first and second wheel hubs can be coupled to one another for a common rotation. It is furthermore disclosed in this document that a differential arrangement which suitably distributes the drive to both wheel hubs can be provided to drive both wheel hubs while simultaneously avoiding increased wear between the two wheel hubs.

It has generally been known for a long time, for example from U.S. Pat. No. 2,267,363 and U.S. Pat. No. 2,357,343, to drive the two wheel hubs of a hub arrangement for twin wheels via a differential and in this respect only to brake one of the wheel hubs directly. Further similar hub arrangements are also known from U.S. Pat. No. 7,757,795 B2, EP 1 288 054 B1, EP 1 145 894 B1 and EP 1 162 082 B1. U.S. Pat. No. 7,757,795 B2 in particular describes a hub arrangement for twin wheels in which a drive shaft drives an intermediate hub via a reduction gear, with the drive being distributed from said intermediate hub via a differential arrangement over two wheel hubs rotatably supported at the intermediate hub. In this respect, a braking apparatus is provided which is effective between the intermediate hub and a stationary axle funnel.

SUMMARY OF THE INVENTION

It is the object of the invention to provide a hub arrangement for twin wheels whose two wheel hubs can be driven with small wear and by which it is in particular ensured on a braking on a problematic surface that both wheel hubs experience sufficient braking torques independent of traction.

The object is satisfied by a hub arrangement having the features of claim 1.

In this respect the hub arrangement comprises a stationary carrier which can be configured as an axial funnel, for example; an intermediate hub which is rotatable about an axis of rotation and which can be driven, directly or indirectly, by a drive shaft via a reduction gear, for example; a differential gear whose input is connected to the intermediate hub and which can in particular be formed by the intermediate hub itself; a first wheel hub which is connected to a first output of the differential gear to be driven via the differential gear; and a second wheel hub which is connected to a second output of the differential gear to be driven via the differential gear. A drive torque of the drive shaft is in this manner first transmitted to the intermediate hub and is then distributed to both wheel hubs via the differential gear. A non-uniform wear of the twin wheels is in particular avoided during cornering by such a differential drive of the two wheel hubs.

Two braking apparatus are furthermore provided in the hub arrangement in accordance with the invention. The first braking apparatus is effective between the stationary carrier and the intermediate hub. The second braking apparatus is effective between the stationary carrier and the second wheel hub or between the intermediate hub and the second wheel hub. The fact that a respective braking apparatus is effective between two elements in particular means in this respect that braking torques can be directly transmitted from the respective one element or from a part rotationally connected thereto via the braking apparatus to the respective other element or to a part rotationally fixedly connected thereto.

It is therefore possible by means of the first braking device to brake the intermediate hub and thus to set the two wheel hubs free of drive overall. However, a relative movement of the wheel hubs relative to one another is not prevented by the first braking apparatus alone. If, for instance, unequal traction is applied to respective wheels of the two wheel hubs, the wheel with smaller traction could spin and the other wheel could as a result run on with insufficient braking effect or even without braking. The second braking apparatus is therefore provided which brakes the second wheel hub either with respect to the stationary carrier or with respect to the intermediate hub (which is then optionally in turn braked with respect to the stationary carrier), whereby then a relative movement of the two wheel hubs with respect to one another is also prevented or at least braked overall. It can be ensured in this manner that both wheel hubs experience the desired braking torque.

In this respect, the first braking apparatus and the second braking apparatus can be actuated separately from one another. This makes it possible, for example, first only to brake the intermediate hub and only also to activate the second braking apparatus if necessary due to the traction, for instance. In addition, two braking apparatus which can be actuated separately from one another can be arranged with a more flexible construction, namely e.g. spaced apart from one another, within the hub arrangement than two braking apparatus necessarily actuable together. It is moreover in particular simpler from a construction aspect if both braking apparatus are effective with respect to the stationary carrier, only to brake one of the two wheel hubs, for example, the axially inner wheel hub, and the intermediate hub with respect to the stationary carrier than to brake the two axially adjacent wheel hubs respectively separately with respect to the stationary carrier. The two braking apparatus can thus be arranged in the hub arrangement in accordance with the invention while ideally utilizing the available construction space and can simultaneously be controlled in a simple manner (in particular from the stationary or axially inner side). It is in particular also not necessary to brake the two rotating wheel hubs relative to one another.

Advantageous further development result from the dependent claims and from the embodiments shown.

The first wheel hub and the second wheel hub can, for example, be arranged coaxially to one another and in particular coaxially to the named axis of rotation. The differential gear effective between the intermediate hub and the two wheel hubs can in particular be configured as a bevel differential gear.

The intermediate hub which can in particular be driven by the drive shaft via a reduction gear is advantageously rotatably supported at the stationary carrier. Provision can be made with respect to the support of the wheel hubs that the first wheel hub and/or the second wheel hub is/are rotatably supported at the intermediate hub. It is, however, alternatively also possible that one of the two named wheel hubs is rotatably supported at the intermediate hub and the other wheel hub is rotatably supported at this one wheel hub. A particularly compact construction is possible by such supports.

In accordance with a preferred further development, the first braking apparatus has a first piston which is axially movably supported at the stationary carrier, and/or the second braking apparatus has a second piston which is axially movably supported at the stationary carrier, wherein the named axial movability is respectively with respect to the named axis of rotation of the hub arrangement. The pistons can, for example, be hydraulically actuable.

The first braking apparatus and the second braking apparatus can furthermore be arranged axially offset from one another with respect to the axis of rotation. Alternatively or additionally, the first braking apparatus and the second braking apparatus can be arranged radially offset from one another with respect to the axis of rotation. In particular when the two braking apparatus are arranged offset from one another only axially or only radially with respect to the axis of rotation, particular advantages can result from this with respect to the construction space and with respect to the contacting of the braking apparatus for the purpose of their actuation since e.g. lines can be guided in parallel or the braking apparatus can be arranged in a compact manner adjacent to one another.

It is furthermore advantageous if the first braking apparatus has a disk pack associated with the stationary carrier and comprises a disk pack cooperating therewith and associated with the intermediate hub, wherein the disk pack associated with the stationary carrier engages into the disk pack associated with the intermediate hub radially from the outside or radially from the inside with respect to the axis of rotation. In a comparable manner, it is alternatively or additionally advantageous for the second braking apparatus to comprise a disk pack associated with the stationary carrier or with the intermediate hub and a disk pack cooperating therewith and associated with the second axis of rotation, wherein the disk pack associated with the stationary carrier or with the intermediate hub engages into the disk pack associated with the second intermediate hub radially from the outside or radially from the inside. Depending on whether the named engagement takes place radially from the outside or radially from the inside, the respective braking apparatus can be matched particularly well to braking torques to be expected in a suitable manner. The respective disk packs can in particular be pressed toward one another by means of the named pistons.

BRIEF DESCRIPTION OF THE DRAWINGS

The invention will be described in more detail in the following with reference to the Figures.

FIGS. 1 to 6 show in a schematic representation in each case different embodiments of hub arrangements in accordance with the invention which substantially differ from one another by the relative arrangement of the two braking apparatus with respect to one another, by the direction of engagement of respective disk packs of the braking apparatus, and/or by the respective arrangement of the second braking apparatus between the stationary carrier and the second wheel hub or between the intermediate hub and the second wheel hub.

Mutually corresponding elements of the different embodiments are marked by the same respective reference numeral in the Figures.

DETAILED DESCRIPTION OF THE PREFERRED EMBODIMENTS

Figure 1:
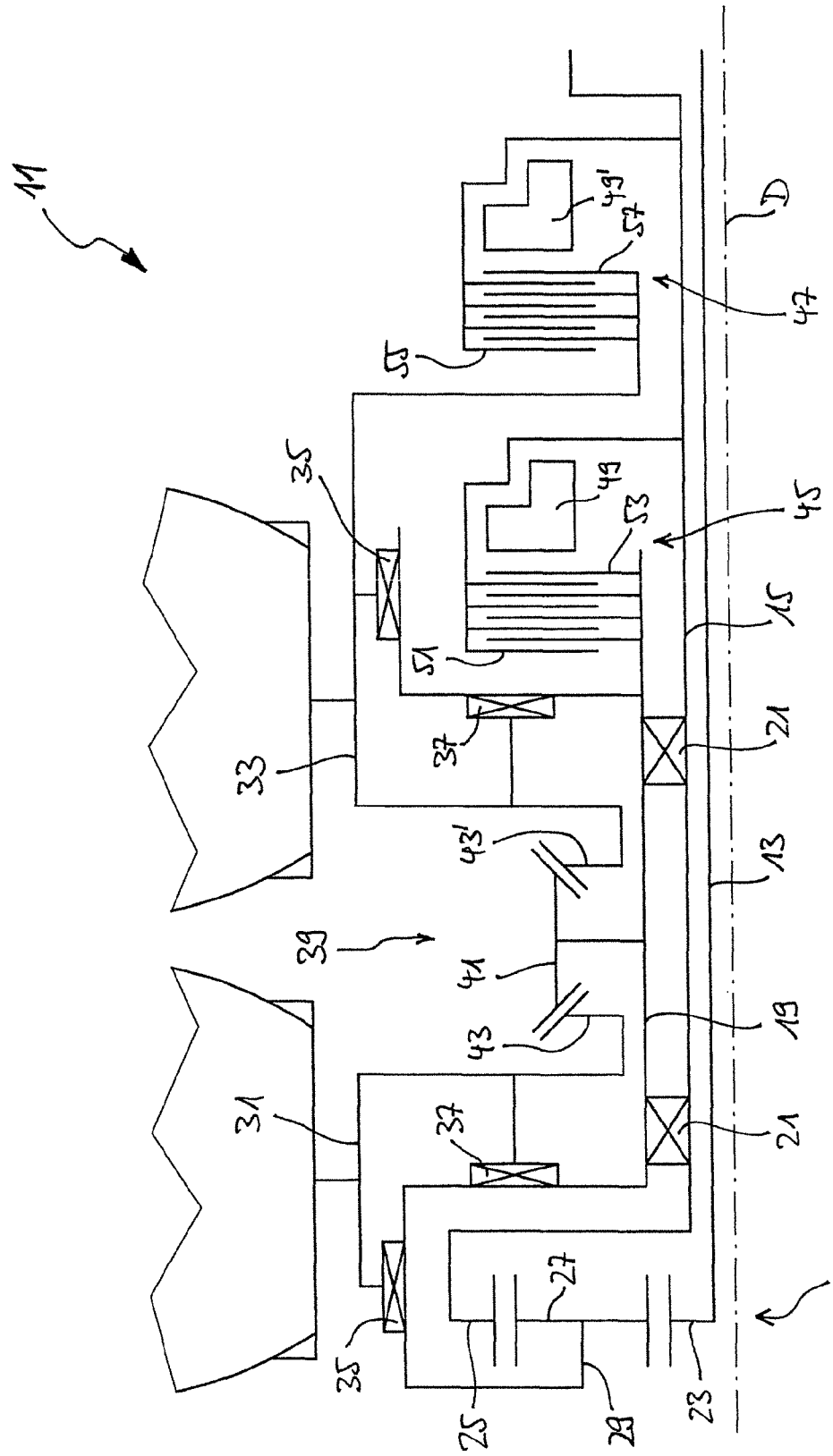

It is common to all the FIGS. 1 to 6 that only an upper half of the embodiment of a hub arrangement 11 in accordance with the invention shown therein is shown in a very simplified schematic sectional representation. The section in this respect extends radially with respect to and starting from an axis of rotation D with respect to which the hub arrangement 11 is configured substantially rotationally symmetrically. Only one (namely the left hand) axis side is shown; at the other side, the respective vehicle axle has a corresponding hub arrangement 11 in a specular symmetrical design.

The hub arrangement 11 respectively comprises a drive shaft 13 which can be driven by an engine (not shown), for example via an axial differential (likewise not shown) to make a rotation about the axis of rotation D. The drive shaft 13 is arranged within a stationary carrier 15 configured as an axial funnel and is drive-effectively connected to a reduction gear 17 via which the drive shaft 13 can drive an intermediate hub 19 to make a rotation about the axis of rotation D. The intermediate hub 19 is in this respect rotatably supported via bearing apparatus 21 at the stationary carrier 15.

The reduction gear 17 is configured as a planetary transmission and comprises a sun gear 23 which is rotationally fixedly connected to the drive shaft 13. An annulus gear 25 of the planetary transmission is coupled to the stationary carrier 15 and is thereby likewise stationary. Planetary gears 27, of which only one is shown and which are supported at a planet carrier 29, mesh with the sun gear 23 and with the annulus gear 25. The planet carrier 29 in this respect forms the output of the reduction gear 1 and is connected to the intermediate hub 19 for a common rotation.

The hub arrangement 11 furthermore comprises a first wheel hub 31 and a second wheel hub 33 which are both respectively supported at the intermediate hub 19 rotatable about the axis of rotation D, wherein bearing apparatus 35 and 37 are respectively provided for the radial and axial support. To distribute the drive torque transmitted onto the intermediate hub 19 by the drive shaft 13 over the two wheel hubs 31, 33, a differential gear 39 is provided which is configured, for example, as a bevel differential. In this respect, an input 41 of the differential gear 39 is fixedly connected to the intermediate hub 19. The input 41 can in particular have spigots which are aligned radially to the axis of rotation D and at which a respective compensation bevel gear is rotatably supported. Two further bevel gears which mesh with the compensation bevel gears form outputs 43, 43' of the differential gear 39 and are fixedly connected to a respective one of the wheel hubs 31, 33 for a common rotation. In this manner, the differential gear 39 allows the transmission of drive torque from the intermediate hub 19 to the two wheel hubs 31, 33, wherein a relative movement of the wheel hubs 31, 33 relative to one another is permitted, whereby wear and slip are in particular avoided during cornering.

The design of the hub arrangement 11 shown with a drive shaft 13 guided in the stationary carrier 15, with an intermediate hub 19 supported at the stationary carrier 15 and with wheel hubs 31, 33 supported at the intermediate hub 19, all of them being arranged coaxially to one another, allows a particularly compact design of the hub arrangement 11 which is in particular especially important with wheel drives for twin wheels.

For the active braking of both wheel hubs 31, 33, the hub arrangement 11 furthermore comprises a first braking apparatus 45 and a second braking apparatus 47 which are configured separately from one another in the manner of multiple-disk clutches and which are also actuable separately from one another. In this respect, the two braking apparatus 45, 47 each comprise disk packs 51, 53 and 55, 57 respectively as well as a respective movable piston 49 and 49' which are supported at the stationary carrier 15 axially to the axis of rotation D and by means of which the disks of the two respective disk packs 51, 53 or 55, 57 respectively can be brought into contact with one another to brake a movement of the two respective disk packs 51, 53 or 55, 57 respectively relatively to one another, optionally up to a frictionally engaging, rigid connection of the two disk packs 51, 53 or 55, 57 respectively to one another.

In all the hub arrangements 11 shown in FIGS. 1 to 6, the first braking apparatus 45 is effective between the stationary carrier 15 and the intermediate hub 19. In the embodiments in accordance with FIGS. 1 to 4, the second braking apparatus 47 is in this respect effective between the stationary carrier 15 and the second wheel hub 33, whereas in the embodiments in accordance with FIGS. 5 and 6, the second braking apparatus 47 is effective between the intermediate hub 19 and the second wheel hub 33. In these last-named cases, the second wheel hub 33 is consequently indirectly braked via the intermediate hub 19 at the stationary carrier 15.

The embodiments shown in the Figures furthermore differ with respect to the relative arrangement of the two braking apparatus 45, 47 with respect to one another. In the embodiments in accordance with FIGS. 1, 3, and 5, the respective first braking apparatus 45 and the second braking apparatus 47 are arranged axially offset from one another with respect to the axis of rotation D. This in particular allows a design which only takes up a small construction space in the radial direction and in which advantageously identical parts can be used for the pistons 49, 49' and for the disk packs 51, 55 or 55, 57 respectively for both braking apparatus 45, 47. In the embodiments in accordance with FIGS. 2, 4, and 6, in contrast, the first braking apparatus 45 and the second braking apparatus 47 are arranged radially offset from one another with respect to the axis of rotation D. In this manner, a particularly small axial construction width can be implemented, which can be advantageous in dependence on the planned application, in particular with short axles.

A further difference between the hub arrangements 11 shown in the different Figures results from the alignment of the respective disk packs 51, 55 or 55, 57 respectively of the braking apparatus 45, 47. In this respect, in the embodiments of FIGS. 1, 2, 5 and 6, the disk pack 51 of the first braking apparatus 45 associated with the stationary carrier 15 engages radially from the outside with respect to the axis of rotation D into the disk pack 53 of the first braking apparatus 45 associated with the intermediate hub 19, whereas in the embodiments of FIGS. 3 and 4, actually conversely, the disk pack 51 associated with the stationary carrier 15 engages radially from the inside into the disk pack 53 associated with the intermediate hub 19.

Figure 2:
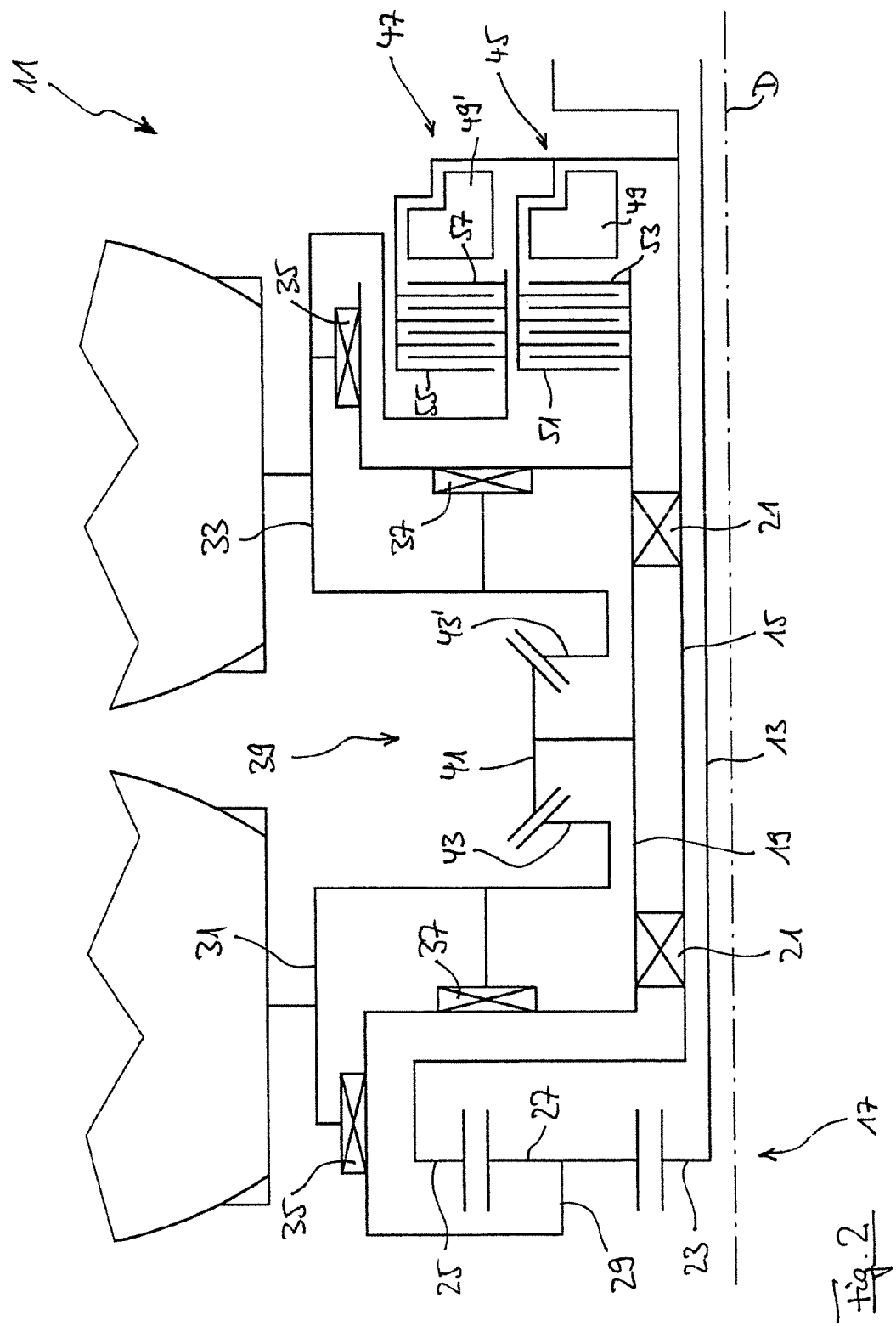
Figure 3:
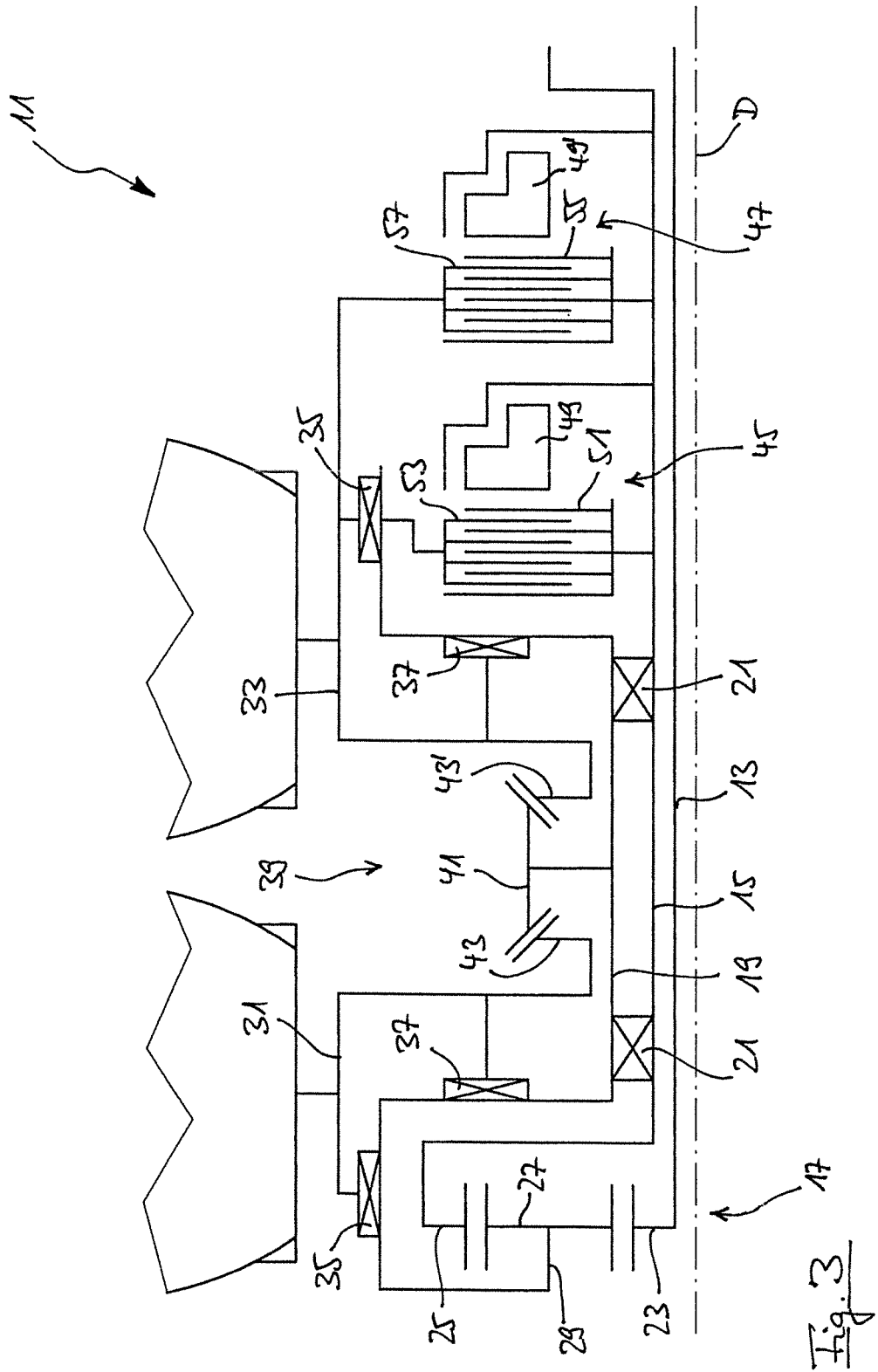
Figure 4:
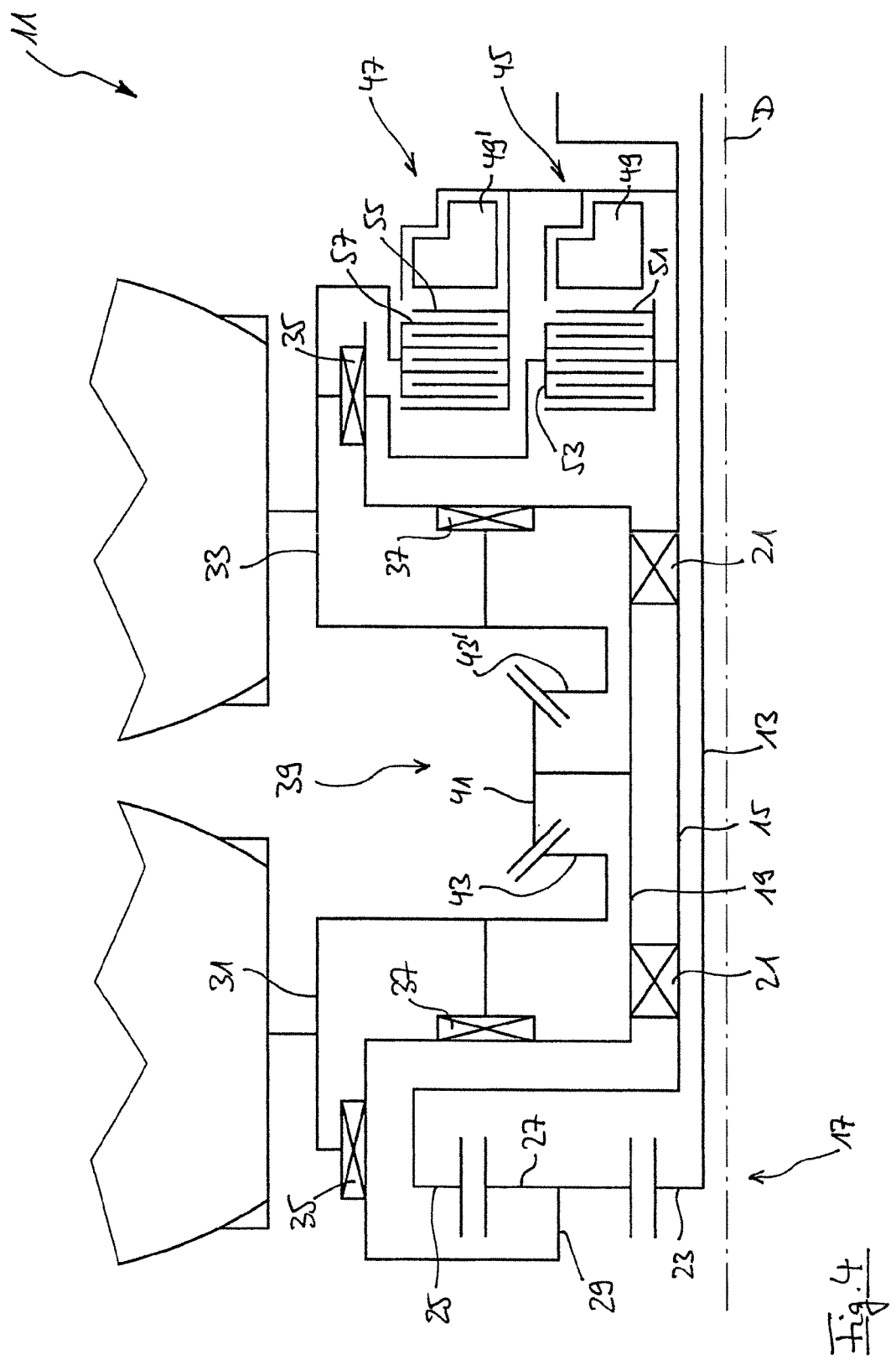

With respect to the second braking apparatus 47. FIGS. 1 and 2 show embodiments in which the disk pack 55 of the second braking apparatus 47 associated with the stationary carrier 15 respectively engages into the disk pack 57 associated with the second wheel hub 33 radially from the outside with respect to the axis of rotation D. In contrast, in the embodiments of FIGS. 3 and 4, actually conversely, the disk pack 55 of the second braking apparatus 47 associated with the stationary carrier 15 engages into the disk pack 57 of the second braking apparatus 47 associated with the second wheel hub 33 radially from the inside with respect to the axis of rotation D.

In a manner corresponding hereto, in the embodiments in accordance with FIGS. 5 and 6, the disk pack 55 of the second braking apparatus 47 associated with the intermediate hub 19 engages into the disk pack 57 of the second braking apparatus 47 radially from the inside with respect to the axis of rotation D. It is generally correspondingly possible that the mutual engagement of the respective disk packs 55, 57 takes place exactly conversely with respect to the radial alignment to the axis of rotation D.

In addition, further embodiments can be implemented in which a described arrangement and alignment of the disk packs 51, 53 of the first braking apparatus 45 are present in a combination with a described arrangement and alignment of the disk packs 55, 57 of the second braking apparatus 47 which is not explicitly described in this combination above.

It is in this respect common to all these embodiments of a hub arrangement 11 that, due to the drive via a differential gear, in particular by avoiding slip, a comparatively small wear is achieved at both wheels or tires associated with the wheel hubs 31, 33 and that, due to the separate actuation of the first braking apparatus 45 of and of the second braking apparatus 47, which also prevent a relative movement of the wheel hubs 31, 33 to one another, a reliable braking of both wheels can be ensured also in a situation of problematic traction. In this respect, in dependence on the respective demand, the respective available construction space can be ideally used by a suitable choice of one of the described embodiments, with the construction simultaneously allowing a good accessibility of the braking apparatus 45, 57 for their control.

The invention claimed is:

1. A hub arrangement for twin wheels, comprising
a stationary carrier;
an intermediate hub which is rotatable about an axis of rotation (D) and which can be driven by a drive shaft;
a differential gear having an input which is connected to the intermediate hub;
a first wheel hub which is connected to a first output of the differential gear;
a second wheel hub which is connected to a second output of the differential gear;
a first braking apparatus which is effective between the stationary carrier and the intermediate hub; and
a second braking apparatus which is effective between the stationary carrier and the second wheel hub or between the intermediate hub and the second wheel hub, wherein the first braking apparatus and the second braking apparatus can be actuated separately from one another;
wherein the first braking apparatus has an axially movable first piston supported at the stationary carrier; and
wherein the second braking apparatus has an axially movable second piston supported at the stationary carrier.

2. A hub arrangement in accordance with claim 1, wherein the first wheel hub and the second wheel hub are arranged coaxially to one another.

3. A hub arrangement in accordance with claim 1, wherein the differential gear is configured as a bevel differential.

4. A hub arrangement in accordance with claim 1, wherein the intermediate hub is rotatably supported at the stationary carrier.

5. A hub arrangement in accordance with claim 1, further comprising a reduction gear, wherein the intermediate hub is driven by the drive shaft (13) via the reduction gear.

6. A hub arrangement in accordance with claim 1, wherein at least one of the first wheel hub and the second wheel hub is rotatably supported at the intermediate hub.

7. A hub arrangement in accordance with claim 1, wherein the first wheel hub is rotatably supported at the intermediate hub and the second wheel hub is rotatably supported at the first wheel hub.

8. A hub arrangement in accordance with claim 1, wherein the second wheel hub is rotatably supported at the intermediate hub and the first wheel hub is rotatably supported at the second wheel hub.

9. A hub arrangement in accordance with claim 1, wherein the first braking apparatus and the second braking apparatus are arranged axially offset from one another with respect to the axis of rotation (D).

10. A hub arrangement in accordance with claim 1, wherein the first braking apparatus and the second braking apparatus are arranged radially offset from one another with respect to the axis of rotation (D).

11. A hub arrangement for twin wheels, comprising
a stationary carrier;
an intermediate hub which is rotatable about an axis of rotation (D) and which can be driven by a drive shaft;
a differential gear having an input which is connected to the intermediate hub;
a first wheel hub which is connected to a first output of the differential gear;
a second wheel hub which is connected to a second output of the differential gear;
a first braking apparatus which is effective between the stationary carrier and the intermediate hub; and
a second braking apparatus which is effective between the stationary carrier and the second wheel hub or between the intermediate hub and the second wheel hub, wherein the first braking apparatus and the second braking apparatus can be actuated separately from one another;
wherein the first braking apparatus comprises a disk pack associated with the stationary carrier and a disk pack cooperating therewith and associated with the intermediate hub, with the disk pack associated with the stationary carrier engaging into the disk pack associated with the intermediate hub radially from the outside or radially from the inside with respect to the axis of rotation (D).

12. A hub arrangement for twin wheels, comprising
a stationary carrier;
an intermediate hub which is rotatable about an axis of rotation (D) and which can be driven by a drive shaft;
a differential gear having an input which is connected to the intermediate hub;
a first wheel hub which is connected to a first output of the differential gear;
a second wheel hub which is connected to a second output of the differential gear;
a first braking apparatus which is effective between the stationary carrier and the intermediate hub; and
a second braking apparatus which is effective between the stationary carrier and the second wheel hub or between the intermediate hub and the second wheel hub, wherein the first braking apparatus and the second braking apparatus can be actuated separately from one another;
wherein the second braking apparatus comprises a disk pack associated with the stationary carrier or with the intermediate hub and a disk pack cooperating therewith and associated with the second wheel hub, with the disk pack associated with the stationary carrier or with the intermediate hub engaging into the disk pack associated with the second intermediate hub radially from the outside or radially from the inside with respect to the axis of rotation (D).

* * * * *